United States Patent

[11] 3,545,772

| [72] | Inventor | Fred Zollner |
| | | Frot Wayne, Indiana |
| [21] | Appl. No. | 775,992 |
| [22] | Filed | Nov. 1, 1968 |
| | | Continuation of Ser. No. 258,421, |
| | | Feb. 14, 1963, abandoned, which is a continuation-in-part of Ser. No. 768,950, |
| | | Oct. 22, 1958, abandoned. |
| [45] | Patented | Dec. 8, 1970 |
| [73] | Assignee | Zollner Corporation |
| | | Ft Wayne, Indiana |
| | | a corporation of Indiana |

[54] ANNULAR PISTON RING BEARING MEANS
6 Claims, 16 Drawing Figs.

[52] U.S. Cl. .................................................. 277/189.5
   92/227; 29/156.5
[51] Int. Cl. ............................................... F16j 9/22,
   F16j 9/00
[50] Field of Search ........................................... 277/189.5;
   92/227, 229; 29/156.5

[56] References Cited
UNITED STATES PATENTS

| 2,771,328 | 11/1956 | Wainwright et al. | 277/189.5 |
| 2,851,318 | 9/1958 | Smith et al. | 277/189.5X |
| 2,990,225 | 6/1961 | Bucken et al. | 277/184.5 |
| 2,996,341 | 8/1961 | Daub | 277/189.5 |
| 2,996,342 | 8/1961 | Daub | 277/189.5 |
| 3,023,061 | 2/1962 | Daub | 277/189.5 |

Primary Examiner—Samuel D. Rothberg
Attorney—Elmer Jamison Gray

ABSTRACT: An engine piston having a piston head formed with an annular groove receiving a piston ring. A bearing member is embedded in the piston head and extends continuously around the head at one of the piston ring groove surfaces and is provided with inwardly extending interlocking portions adapted to hold the bearing member in the piston head. The bearing member is formed so as to be sufficiently yieldable to respond to the expansion and contraction of the piston head consequent to changes in length of the bearing member as measured in the circumferential direction of this member. Preferably said interlocking portions of the bearing member are annularly spaced apart within the ring groove a different amount than the annular spacing of the portions of the piston head disposed therebetween.

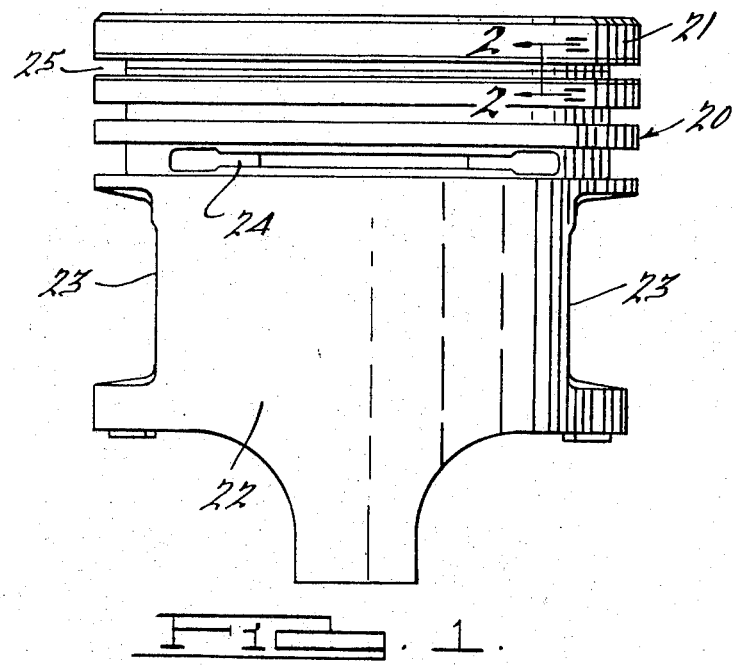
FIG. 1.
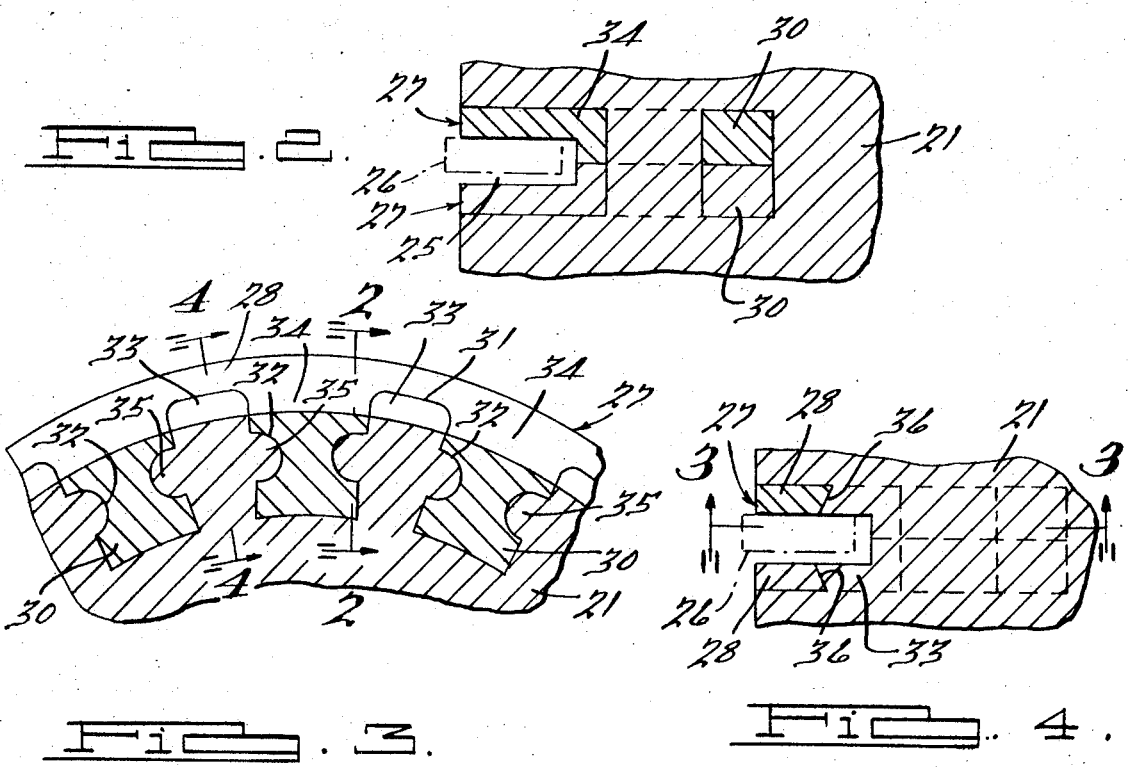
FIG. 2.
FIG. 3.
FIG. 4.

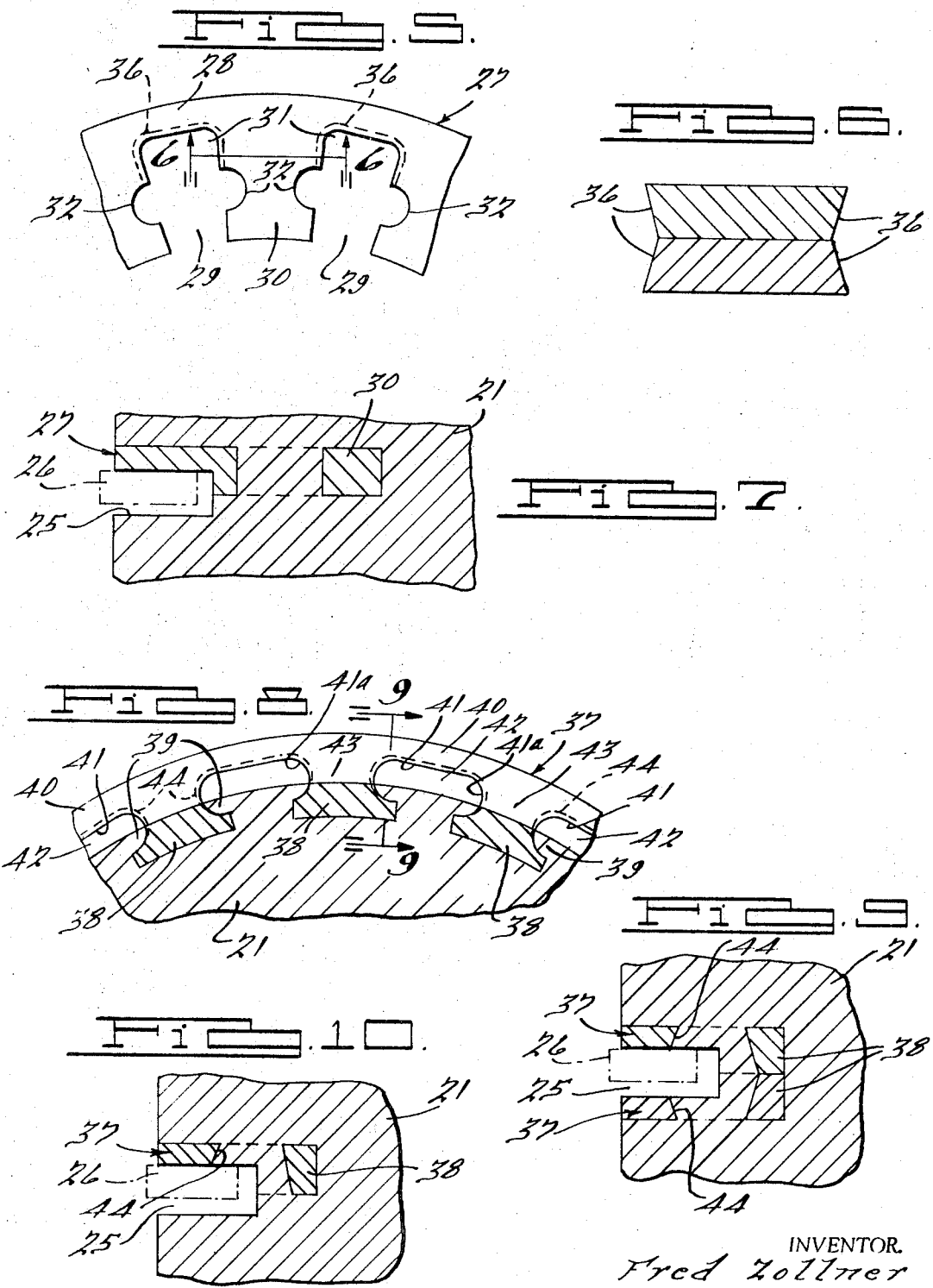

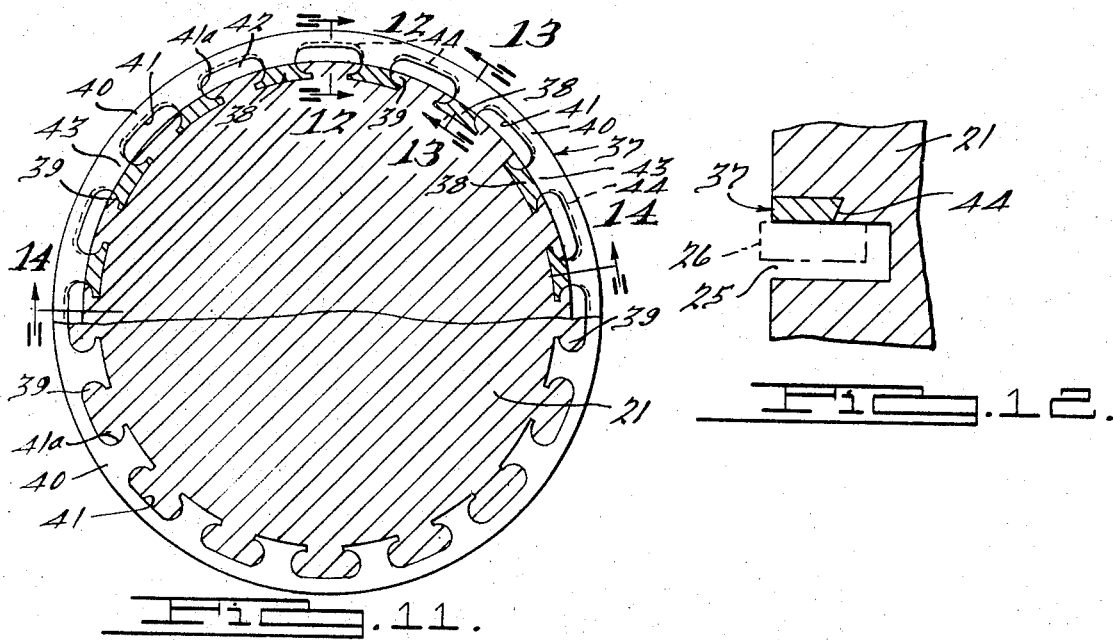
FIG. 11.
FIG. 12.
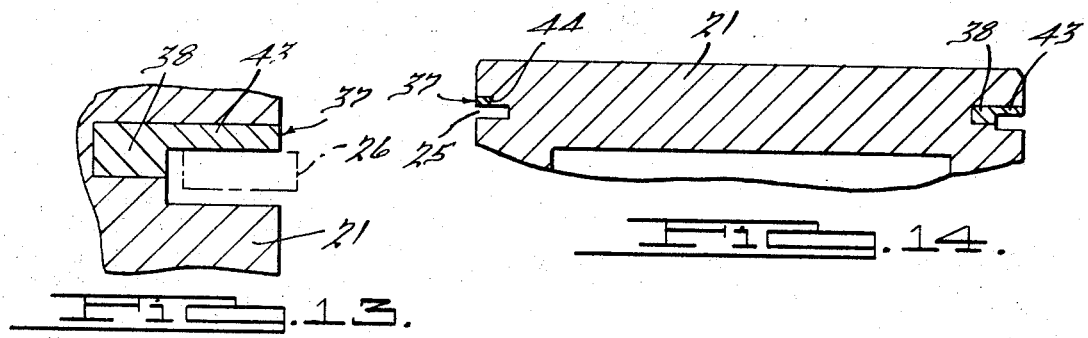
FIG. 13.
FIG. 14.
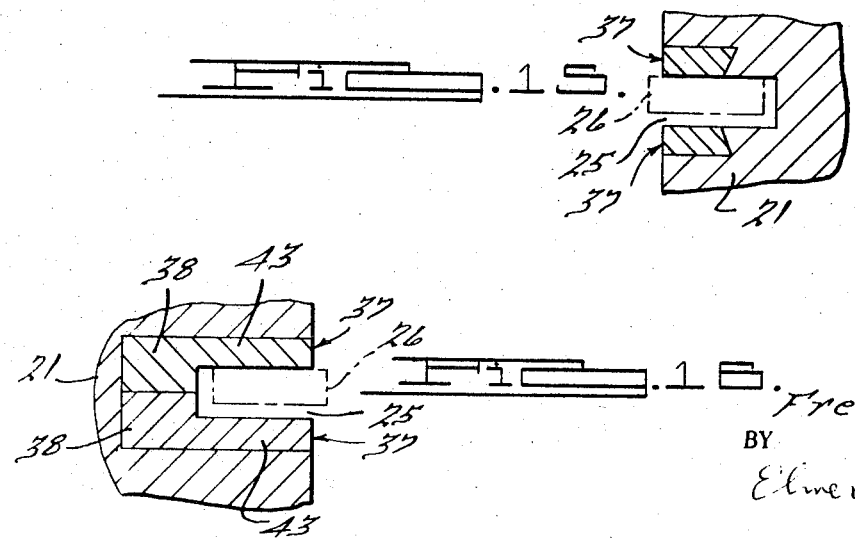
FIG. 15.
FIG. 16.
INVENTOR.
Fred Zollner
BY
Elmer Jamison Gray
ATTORNEY.

ANNULAR PISTON RING BEARING MEANS

This application is a continuation of application Ser. No. 258,421, filed Feb. 14, 1963, which in turn is a continuation-in-part of application Ser. No. 768,950, filed Oct. 22, 1958, and now both abandoned.

This invention relates to pistons for internal combustion engines, such pistons being provided with annular grooves for the reception of piston rings. An important object of the present invention is to provide the piston with a ring groove having annular piston ring bearing means ensuring increased wear resistance and in addition providing in the ring bearing area of the groove such increased heat conductivity as to enable the metal of such bearing area to run cooler under all normal operating conditions.

A further object of the invention is to provide in association with a piston ring groove, such as the upper groove in the head of the piston, an annular bearing insert providing at one face of the ring groove a continuous outer annular ring bearing area and a segmental inner bearing area comprising alternating annularly spaced piston and bearing insert portions. In addition to the foregoing a further objective is to provide the bearing insert inwardly of the annular ring bearing area with annularly spaced portions which, consequent to the casting operation, are not only anchored in position but also held under compressive forces corresponding to the difference in the normal rate of contraction of the metal of the piston and the metal of the bearing insert.

In accordance with the embodiments of the invention herein illustrated by way of example, there is provided a piston groove protecting ring having a continuous outer bearing ring portion merging into annularly spaced piston ring bearing portions or segments separated by notches or slots. Extending radially inwardly from such bearing portions or segments at annularly spaced localities are anchoring members which, after the casting operation, are not only securely interlocked with the head or body of the piston but also held under contractive forces exerted by the piston, such forces corresponding to the difference in the rate of contraction or expansion of the piston metal and the metal of the protecting ring. After formation of the piston ring groove, subsequent to the casting or molding operation, there will be provided at one or each bearing surface of the piston groove a continuous outer protecting ring surface and an inner piston ring engaging surface formed by annularly spaced segments of the protecting ring and intervening annularly spaced portions of the piston casting, the latter being spaced apart a less distance than the spacing of the segments.

In the illustrated embodiment a steel ring insert is embedded in the aluminum piston head and extends continuously around the head at one of the radially extending upper and lower annular surfaces of a piston ring groove in the head. The protecting ring insert or member has radially extending inward portions with radially locking means for securely holding the ring insert in the piston head. For the purpose of ensuring necessary strength these radially extending portions preferably have adequate thickness radially inside of the ring groove. The ring insert or member preferably has a radial width less than the depth of the ring groove and an axial width to provide sufficient rigidity and strength to remain effective under normal operating conditions while at the same time being sufficiently yieldable to respond to the expansion and contraction of the piston head.

During the casting operation the steel ring insert is subject to such considerable compressive forces from the piston head, particularly during the cooling and solidifying period, as to cause the ring insert to yield and foreshorten thereby changing, i.e. reducing, its length as measured in a direction circumferentially or annularly thereof as well as of the piston head, this being due to the fact that the contraction rate of the aluminum piston is substantially twice that of the steel ring incorporated therein. The aluminum while contracting in the cooling process has sufficient strength and actuating or compressive force to compress and shorten the ring insert thereby reducing the circumferential dimension thereof.

An important feature of the present invention resides in the provision of a piston having an annular ring bearing member embedded in the piston head and extending continuously around the piston head at one of the ring groove surfaces, said bearing member having radially extending inward portions locked in the piston head, the ring bearing member having separated parts within the ring groove annularly spaced a total amount exceeding one half the circumferential dimension of the bearing member.

A further important feature of the invention resides in the provision of means for interlocking the annular bearing insert with the piston within the piston ring groove. In the preferred embodiment herein illustrated this is accomplished by providing dovetail joints between portions of the bearing insert and portions of the piston body disposed in engaging relation to the piston ring within the ring groove.

In the preferred construction an aluminum alloy piston, conventionally termed an aluminum piston, is utilized together with a steel piston groove bearing ring. It will, of course, be understood that where desired other nonferrous and ferrous metals may be utilized.

Other objects of this invention will appear in the following description and appended claims, reference being had to the accompanying drawings forming a part of this specification wherein like reference characters designate corresponding parts in the several views.

FIG. 1 is a side view of a piston embodying the present invention.

FIG. 2 is an enlarged sectional view taken through lines 2–2 of FIG. 1 and also FIG. 3 in the direction of the arrows.

FIG. 3 is a fragmentary horizontal sectional view taken through lines 3–3 of FIG. 4 looking in the direction of the arrows.

FIG. 4 is a fragmentary sectional view taken substantially through lines 4–4 of FIG. 3 looking in the direction of the arrows.

FIG. 5 is an enlarged fragmentary plan view of a portion of the bearing insert shown in FIG. 2.

FIG. 6 is a sectional view taken substantially through lines 6–6 of FIG. 5 looking in the direction of the arrows.

FIG. 7 is a fragmentary sectional view in part similar to FIG. 2 but illustrating another embodiment of the invention.

FIG. 8 is a fragmentary horizontal sectional view illustrating a further embodiment.

FIG. 9 is an enlarge fragmentary sectional view taken substantially through lines 9–9 of FIG. 8 looking in the direction of the arrows.

FIG. 10 is a fragmentary sectional view in part similar to FIG. 9 but illustrating a further embodiment.

FIG. 11 is a complete smaller size view in part similar to FIG. 8 with bearing ring partly in section.

FIG. 12 is a fragmentary sectional view in part similar to FIG. 10.

FIG. 13 is a fragmentary sectional view taken through lines 13–13 of above FIG. 11.

FIG. 14 is a fragmentary sectional view taken through lines 14–14 of above FIG. 11.

FIG. 15 is a fragmentary sectional view illustrating a modified embodiment of the structure illustrated in above FIG. 12.

FIG. 16 is a fragmentary sectional view illustrating a modified embodiment of the structure illustrated in above FIG. 13.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In FIG. 1 of the drawings there is illustrated a suitable piston 20 which is cast in one piece in a permanent mold and is preferably of an aluminum alloy. The piston is provided with a head 21 and a depending skirt 22 formed with the usual opposed wrist pin bosses at localities indicated at 23, these bosses having aligned wrist pin openings (not shown). In the present instance the skirt is partially separated from the head by opposed slots, one thereof being illustrated at 24. The piston head 21 is formed with a suitable number of annular ring grooves to receive the piston rings, the upper ring groove being indicated at 25 within which is disposed the upper piston ring indicated in broken lines at 26 in FIGS. 2, 4, 7, 9 and 10.

In the embodiment of the invention illustrated in FIGS. 1 to 6 there are provided upper and lower protecting rings or inserts 27 similar in construction and cast anchored in the piston in overlying uniform engagement, these protecting rings together with associated portions of the piston being machined after the casting operation to form the upper ring groove 25. The piston groove protecting rings in the present embodiment, as well as other embodiments herein illustrated, are preferably formed of steel, although it is understood that in some instances the protecting rings may be formed from other ferrous or nonferrous metals of sufficient hardness as compared with the aluminum alloy of the piston to afford the desired wear resistance.

Each of the protecting rings or inserts 27 is provided with a continuous outer bearing ring portion 28. Inwardly thereof each ring is formed with radial slots or openings 29 providing segmental anchoring members 30 extending radially inwardly in annularly spaced relation. As particularly shown in FIG. 5, the outer portions of these segments merge into the bearing ring member 28 and are separated by annularly spaced terminal or outer openings 31. Each radially extending segment member 30 is formed at opposite edges thereof with arcuate anchoring notches 32.

With reference particularly to FIGS. 2 to 4, it will be seen that the upper ring groove of the finished piston, after machining operations of the piston casting, is provided with a continuous outer steel bearing area 28. Thus, during piston operation this bearing area 28 is formed by upper and lower annular strips of steel forming continuous outer ring bearing area and supporting substantially the outer half of the piston ring 26. Since the bulk or most of the pressure area of the piston ring is along the outer half thereof it follows that the annular bearing areas of the outer bearing ring portions 28 provide maximum wear resistance during operation.

The major portions of the terminal or outer openings 31 of each bearing ring are disposed within the upper ring groove. Thus, consequent to the casting operation and as particularly shown in FIG. 3, annularly spaced bearing portions 33 of the piston casting are anchored in openings 31 at localities within the piston ring groove inwardly of the continuous annular bearing areas 28. In alternating relation to the aluminum bearing portions 33 the segmental members 30 of the protecting rings provide spaced ring engaging segments 34 which with the intervening annularly spaced portions 33 of the piston casting form approximately the inner half of the piston ring bearing. Inwardly of the piston ring bearing segments 34 the members 30 are firmly embedded within the piston head and held in interlocked relation thereto by portions 35 of the piston casting extending into the anchoring notches 32.

With reference to FIGS. 4, 5, and 6, it will be noted that the generally U-shaped edges of the outer terminal openings 31 of the radial slots 29 in each bearing ring 27 are beveled at 36. Thus, when the bearing ring is cast in the piston these beveled edges of the ring in conjunction with the contiguous edges of the portions 33 of the piston casting provide interlocking or dovetail joints which have the important advantage of preventing any movement or displacement of the bearing ring portions during operation and particularly any movement thereof due to inertia forces.

In connection with pistons for certain types of engines it has been found that adequate protection of the piston ring groove may be obtained by providing a ring bearing member or protecting ring 27 at only the upper face of the ring groove. This is illustrated in FIG. 7 wherein the construction is otherwise the same as above described and illustrated in connection with the upper protecting ring construction of the embodiment of FIGS. 1 to 6 inclusive.

In the embodiment of the invention illustrated in FIGS. 8 to 14 the upper ring groove 25, herein selected by way of example, is protected by means of an upper bearing member 37. This bearing member is formed with a continuous series of annularly spaced anchoring portions 38 extending radially inwardly in spaced relation and, as illustrated, anchored in the piston head at 39 inwardly of the ring groove in interlocking relation to the head. The bearing member 37 is formed with an outer annular portion 40 which provides a continuous ring bearing. Inwardly of this annular ring bearing portion the bearing member 37 is provided with elongated annularly spaced openings or slots 41 the opposite ends 41a of which are reversely curved so as to merge with the outer edge of the anchoring portions 38.

From the foregoing it will be understood that, after the casting operation, portions 42 of the piston will be snugly anchored within the openings 41, these portions providing with the adjacent inwardly extending portions 43 of the bearing member a compound bearing area within the piston ring groove. In the present embodiment the edges of the openings 41 in the bearing member are beveled at 44 and in conjunction with contiguous edges of the piston casting provide interlocking or dovetail joints. In the embodiment of FIGS. 10 to 14 desired protection of the piston ring groove is obtained by providing a ring bearing member or protecting ring 37 at only the upper face of the ring groove. This construction is utilized in certain types of pistons where a single upper ring bearing member affords the needed protection against wear. With respect to certain other types of pistons upper and lower ring bearing or protecting rings 37 are desirably provided at both the upper and lower faces of the ring groove as illustrated in FIGS. 8, 9, 15 and 16. It will be particularly noted that the piston ring bearing portions 42 of the piston casting are circumferentially elongated. As a result these bearing portions are materially greater in length circumferentially than the width of the intervening ring bearing portions 43 of the bearing member 37.

It is important to note that the improved construction of the piston and protecting ring anchored therein under preload eliminates any bimetallic expansion problem at any of the various operating temperatures and ensures substantially a constant nonvarying relationship between the entire protecting ring insert and the adjacent portions of the piston irrespective of the difference in expansion of the aluminum alloy of the piston and the ferrous or nonferrous metal of the protecting ring.

During casting operation and as the aluminum of the piston cools and solidifies it contracts at its own contraction rate which is approximately twice the contraction rate of the ferrous ring insert. This insert during the cooling period increases in temperature by conduction from the hot aluminum and at temperatures above or in the neighborhood of 600° F. the cooling aluminum and ring insert arrive at substantially the same temperature. At such time the aluminum while contracting in the cooling process has sufficient strength to compress the ring insert. During such cooling process the ring insert contracts at its own contraction rate. Hence, the amount of compression forces exerted on the ring insert corresponds to the difference in the normal contraction rate of the aluminum piston and the normal contraction rate of the ring insert. These compression forces are exerted by the piston, including the bearing portions 42 thereof, against the bevel edges 44 of the openings or slots 41 and the communicating edges of the notches of portions 38 by which the latter are cast anchored within the piston body. Thus, at the above localities there is provided not only a mechanical interlock but also a construction in which the insert is compressed at the time of casting, the amount of compression being the same as the difference in rate of expansion between the aluminum of the piston and the insert metal.

In view of the foregoing it will be understood that during operation of the engine, the aluminum piston body expands at its normal rate and, in effect, carries the ring insert with it. Inasmuch as the insert is in compression to the extent of the difference in the amount of expansion of the piston body that might occur, no relative movement will take place between the insert and the piston at the piston ring groove.

Referring particularly to FIGS. 8 and 11 it will be seen that the steel ring insert or bearing member 37 extends continuously around the piston head and is provided with annularly spaced radially extending inwardly located anchoring portions or members 38 provided with radially disposed locking means or anchoring notches 41a which in conjunction with portions of the piston head casting interlocked therewith, such as at 39, securely hold the ring insert in the piston head inwardly of the ring groove in interlocking relation to the head. As clearly shown, for example, in FIG. 13 the anchoring portions 38 at localities radially inside of the ring groove 25 have a thickness substantially greater than one-half of the groove width. Also, as shown in FIG. 12 the ring insert or member has a radial width less than the depth of the ring groove and an axial width, as clearly shown in FIGS. 13, 14, and 16, to provide a sufficiently rigid means inherently and functionally of such strength as to prevent the insert from being ruptured or rendered ineffective under any and all operating conditions while at the same time rendering the insert member sufficiently yieldable to respond to the expansion and contraction of the piston head during engine operation.

The steel ring insert 37 during the casing operation, and as the aluminum of the piston cools, contracts at a rate approximately one-half of the contraction rate of the aluminum of the piston head. Hence, it is subject to such markedly large and considerable compressive forces from the piston head as to cause this steel ring insert 37 to yield and foreshorten thereby changing, i.e. reducing, its annular length measured circumferentially thereof. Thus, the aluminum while contracting in the cooling process at approximately twice the contraction rate of the steel ring exerts such annular compressive forces on the ring as to compress and shorten the insert and result in subjecting the portions thereof to continuously exerted or applied opposed forces effective to cause the same, even to some measurable or calculable degree, to be drawn, forced or compressed radially inwards or in inward radial directions. As a consequence the circumferential dimension of the ring insert is reduced.

The dovetail joints at 41a, FIGS. 8 and 11 and the beveled edges of the ring members such as at FIGS. 9 and 12 provide interlocking means between the steel ring member 37 and piston head which inherently permit contraction and reduction in circumference of the ring member with the piston head on cooling and solidification thereof. This interlocking means at all times maintains the lock between the piston head and ring member and both inherently and functionally prevent any excessive internal stresses within the ring member and between the latter and the piston head.

I claim:

1. A piston structure comprising a piston head of aluminum material, a piston ring groove in said head having radially extending upper and lower piston ring groove surfaces, a member embedded in said piston head and extending continuously around said piston head at one of said piston ring groove surfaces and having radially extending inward portions with radially locking means for holding said member in said piston head, said member having a radial width less than the depth of said piston ring groove and having an axial width to provide means having sufficient rigidity and strength to prevent rupture of said member and sufficiently yieldable to respond to the expansion and contraction of said piston head by changes in the length of said member as measured in the circumferential direction of said member.

2. A piston structure comprising a piston head of aluminum material, a piston ring groove in said head having upper and lower piston ring groove surfaces, a bearing member embedded in said piston head and extending continuously around said piston head at one of said piston ring groove surfaces and having inward portions with locking means for holding said member in said piston head, said member having a radial width less than the depth of said piston ring groove and having an axial width to provide means sufficiently yieldable to respond to the expansion and contraction of said piston head by changes in the length of said member as measured in the circumferential direction of said member.

3. A piston comprising in finished condition a cast aluminum piston head provided with an annular ring groove to receive a piston ring, a continuous outer annular piston ring bearing member, anchoring members integral with said bearing member and disposed radially inwardly thereof in annularly spaced relation in the piston head and constructed to provide interlocking relation therewith, said bearing member and piston head having within said ring groove a series of alternating circumferentially spaced interlocking portions with which the piston ring has bearing engagement, the portions of the bearing member being annularly spaced apart a substantially greater amount than the portions of the piston head.

4. A piston structure according to claim 2 wherein said portions of the bearing member are spaced apart a greater amount than intervening portions of the piston head.

5. A piston structure comprising a piston head of aluminum material, a piston ring groove in said head having upper and lower piston ring groove surfaces, a bearing member embedded in said piston head and extending continuously around said piston head at one of said piston ring groove surfaces and having annularly spaced inward portions with locking means for holding said member in said piston head, said member having a radial width less than the depth of said piston ring groove and having an axial width to provide means having sufficient rigidity and strength to prevent rupture of said member and sufficiently yieldable to respond to the expansion and contraction of said piston head, said member and said piston head having means during contraction of said piston head to permit changes in the length of said member as measured in the circumferential direction of said member on the cooling and solidification of said piston head to maintain the lock between said head and member.

6. A piston structure according to claim 5 wherein said bearing member has separated parts within the piston ring groove annularly spaced a substantially greater amount than the annular spacing within the groove of said inward portions.